Figure 1:
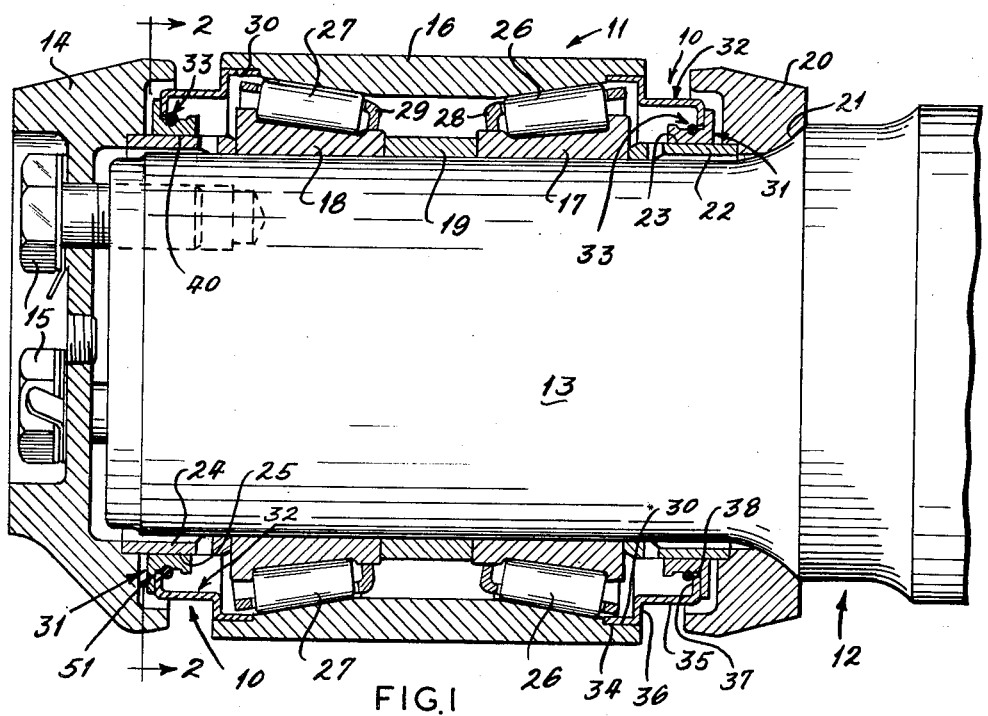

April 10, 1962 R. E. HORGER 3,029,082
SEAL ASSEMBLY
Filed Nov. 13, 1959 2 Sheets-Sheet 1

INVENTOR:
RALPH E. HORGER
By Gravely, Lieder & Woodruff
ATTORNEYS.

April 10, 1962  R. E. HORGER  3,029,082
SEAL ASSEMBLY

Filed Nov. 13, 1959

2 Sheets-Sheet 2

INVENTOR:
RALPH E. HORGER
BY Gravely, Lieder & Woodruff
ATTORNEYS.

United States Patent Office 3,029,082
Patented Apr. 10, 1962

3,029,082
SEAL ASSEMBLY
Ralph E. Horger, Canton, Ohio, assignor to The Timken Roller Bearing Company, Canton, Ohio, a corporation of Ohio
Filed Nov. 13, 1959, Ser. No. 852,764
5 Claims. (Cl. 277—136)

This invention relates generally to the seal art and more particularly to improvements in seal assemblies for axle housings and bearings.

Serious problems in providing effective seals for relatively rotatable members have existed heretofore, and an anti-friction bearing assembly for a railroad car is herein set out as a typical illustration. Seals for bearing assemblies or an axle housing are provided to prevent the leakage of lubricant from the bearing cavity between a bearing or axle housing and an axle, and for keeping dust, moisture and like foreign matter out of this cavity. A principal problem in sealing a bearing assembly is due to "bearing lateral" or the inherent relative lateral movement between the races of an anti-friction bearing. In a railroad car installation, bearing lateral is represented by the vertical difference or offset between the axis of the axle and bearing inner race and the axis of the housing and bearing outer race, and even at initial installation of the bearing, as well as during operation, this offset exists. Since bearing lateral is also represented by an unequal clearance condition between the axle and the housing, it is apparent that an annular seal mounted concentrically with one of these relatively rotatable parts will have a variable sealing relationship with different circumferential point on the other of the parts. Another problem also due to the inherent relative lateral movement between the races of a bearing is that of relative eccentric or skewing rotation, which may develop due to wear and pound out conditions within the bearing assembly during operation, and generally results in extremly rapid seal failure. It is known that the bearing lateral or the eccentric rotation condition in assemblies the size of a railroad car journal may be between 0.030 to 0.040 inch and, therefore, seals must be provided which will compensate for this condition.

In the past, two types of closure seals have been provided for sealing bearing assemblies, one of these being a rubbing type seal which is normally rigidly secured to the housing and has a lip in wiping or rubbing contact with the axle or a wear ring thereon. The material used for rubbing seals heretofore has needed resilient properties providing more than the 0.030 to 0.040 inch total diameter runout in order to compensate for the eccentric action existing on rotating seal applications in this size of contruction, but the degree of runout brings the lip or bore section of the enclosure seal under constant flexing action wherein unequal pressures are transmitted around the enclosure bore surface. This condition produces a seal having variable, rather than uniform, turning torque and results in an uneven wear pattern that causes seal leakage.

The other type of closure seal in common use for bearing assemblies is a clearance or labyrinth seal secured to the bearing housing and normally provided with a 0.030 to 0.040 inch diameter running clearance with the outer diameter of the axle or seal wear ring thereon. This clearance is also provided to compensate for bearing lateral and eccentricities to prevent a metal to metal running contact area from developing between the seal and the axle or wear ring at any point along the enclosure seal bore. However, because of bearing lateral it is apparent that the axis of the seal bore is normally below the axis of the axle whereby the maximum clearance is at the bottom of the axle and excessive lubricant leakage occurs.

The principal object of the present invention is to provide a novel seal assembly overcoming the foregoing problems and using either an interference or a clearance seal for effectively sealing a bearing assembly or the like. Another object is to provide a seal assembly having a seal in close running clearance or interference fit with a seal seat, the seal having a floating action with the seat relative to seal mounting means. Another object is to provide a seal adapted to adjust relative to its mounting and maintain a substantially uniform sealing relation with the seal seat therefor. A further object is to provide a non-rotatable floating seal having a close running fit with its seal seat. A still further object is to provide a greatly improved lubricant seal having a minimum of wear in operation and maximum sealing efficiency. These and still other objects and advantages will become more apparent hereinafter.

The invention is embodied in a closure seal for relatively rotatable parts and includes a mounting member secured to one part, a seal having a sealing surface immediately adjacent to another part, and a sealed adjustable clearance between the mounting member and seal. The invention also consists in the parts and in the combinations and arrangements of parts hereinafter described and claimed.

Figure 2:
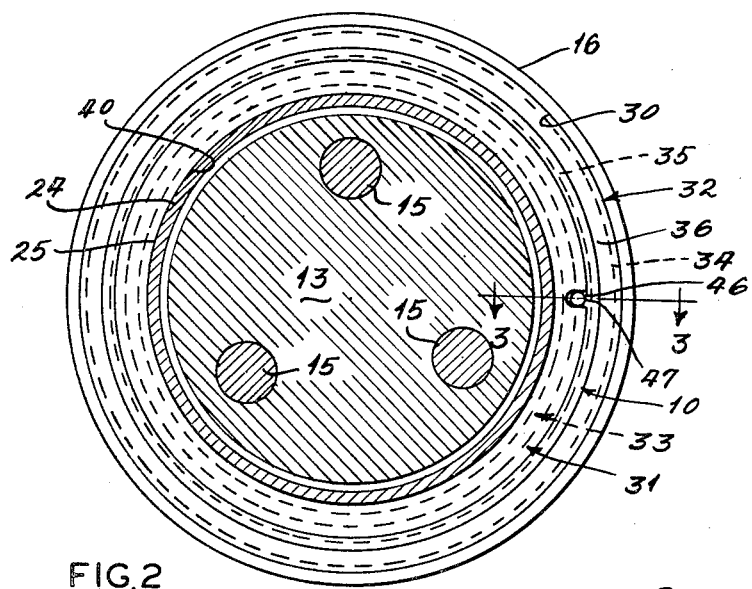
Figure 3:
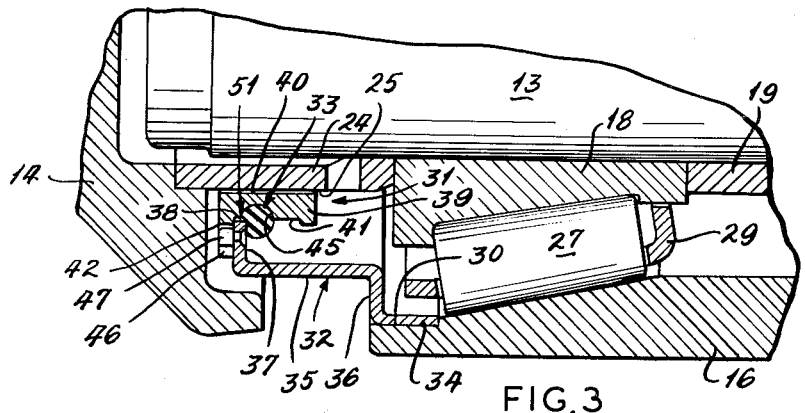
Figure 4:
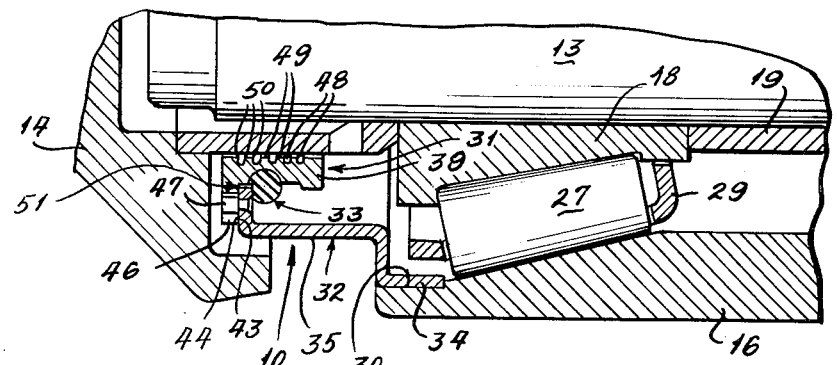
Figure 5:
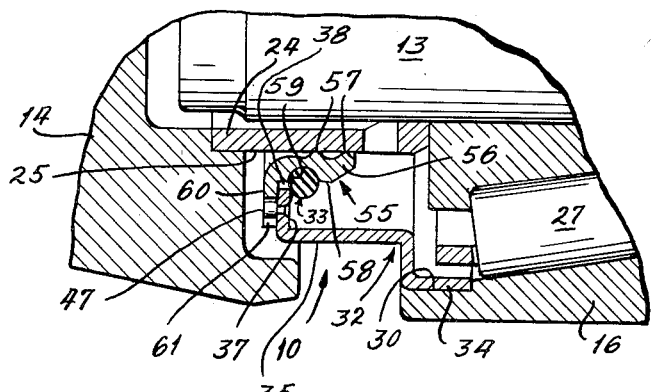

In the accompanying drawings wherein like numerals refer to like parts wherever they occur:

FIG. 1 is a vertical cross-sectional view of a typical railroad car journal having an anti-friction bearing assembly and showing a seal assembly embodying the present invention, FIG. 2 is a vertical cross-sectional view taken substantially along line 2—2 of FIG. 1, FIG. 3 is a greatly enlarged fragmentary cross-sectional view of a clearance seal assembly as taken along line 3—3 of FIG. 2, FIG. 4 is a view similar to FIG. 3, but showing another form of a clearance seal, and FIG. 5 is another view similar to FIG. 3, but showing an interference seal embodying the present invention.

Referring now to FIGS. 1–4 of the drawings, the invention is embodied in a seal assembly 10, which is shown with an anti-friction bearing assembly 11 mounted on a railroad car journal 12 for purposes of disclosure. The axle 13 extends from the car wheel (not shown) and the end portion comprises the journal 12. The anti-friction bearing 11 circumscribes the journal 12 and is clamped thereto by an end cap 14 and cap screws 15.

The bearing assembly 11 shown is a typical tapered roller bearing comprising an outer raceway 16 and an inner raceway including first and second raceway rings 17 and 18 spaced apart by a spacer ring 19. A cone backing ring or thrust ring 20 is seated on fillet shoulder 21 of the axle 13 and a first seal wear ring 22 extends between the thrust ring 20 and the raceway ring 17 to position the latter axially on the journal 12 and provide a wear resistant surface 23 for the seal assembly 10. Similarly, a second seal wear ring 24 having a seal seat or surface 25 extends between the inner raceway ring 18 and the end cap 14, the end cap tightening the entire inner raceway and wear rings of the bearing assembly onto the journal 12 against the fillet shoulder 21. The bearing assembly 11 also includes two rings of tapered rollers 26, 27 each of which has a roller cage 28, 29 to hold the rollers in spaced relation. The ends of the outer raceway 16 are counterbored to provide a shouldered bore 30 for mounting a seal assembly 10 at each end of the bearing assembly 11, but it is to be understood that the seal assembly 10 may also be mounted in a bearing or axle housing (not shown) circumscribing the outer race 16. The seal assemblies are preferably identical and only one will now be described.

As shown best in FIGS. 3 and 4, the seal assembly 10 comprises an annular clearance seal 31, a mounting member 32 and a resilient seal 33. The mounting member 32 comprises an outer seal casing having a large diameter outer cylindrical portion 34 received in the bore 30 of the outer raceway 16 with a press-fit or the like, a smaller diameter inner cylindrical portion 35 connected to the outer portion 34 by a radially extending portion 36, and a radial flange 37 connected to the inner cylindrical portion 35 and having a free inner margin 38.

The annular clearance seal 31 has an L-shaped cross section including a body portion 39 having a bore 40 of predetermined diameter forming an inner sealing surface and also having an outer surface 41. The seal 31 also includes a radial flange portion 42 having a surface 43 adapted to slidably abut the inner surface 44 of the flange 37 of the seal casing. An annular groove 45 is formed in the outer surface 41 of the body portion 39 in which the seal 33 is positioned, the seal 33 comprising a resilient O-ring or the like for yieldably maintaining the seal 31 and mounting member 32 in assembled sealed relationship. It will be seen that the groove 45 is formed in the seal body 39 a predetermined distance from the abutment surface 43 of the seal flange 42, which distance is smaller than the wall thickness of the casing flange 37 whereby the O-ring 33 will be under compression when the seal and mounting member are assembled. The seal flange 42 is provided with a slot 46 extending radially inwardly from the outer margin thereof a predetermined distance, and the flange 37 of the mounting member 32 has an axially extending circular pin or boss 47 received in the slot 46 to prevent relative rotation between the seal 31 and member or casing 32. The slot and pin locking means 46, 47 is preferably positioned on the horizontal diametral plane of the seal 39 as will appear hereinafter.

Referring to FIG. 4 it will be seen that a plurality of axial spaced annular grooves 48 may be formed in the seal bore to form spaced lands 49 having sharp corners 50. This labyrinth clearance seal arrangement is a typical construction forming no part of the present invention.

Although clearance seals heretofore have required a relatively large diameter running clearance, such as 0.030 to 0.040 inch, between the sealing surfaces and the axles on which they were mounted to compensate for bearing lateral and eccentric relative rotation therebetween, the bore 40 of the seal 31 of the present seal assembly is immediately adjacent to the surface 25 of wear ring 24 providing a close running fit having a diameter clearance that ranges between 0.001 minimum and 0.007 maximum inches. Therefore, it is apparent that the sealing efficiency is greatly improved over clearance seals known heretofore. The present seal 31 is mounted for concentric relative rotation with the axle 13 and wear ring 24.

The outer cylindrical portion 34 of the mounting member 32 is secured in the bore 30 of the outer race 16 or in a bearing or axle housing therefor in sealed condition, and the mounting member 32 and the part to which it is secured are in non-rotatable concentric relationship. The bore or free margin 38 of the flange 37 of the mounting member 32 has a predetermined diametral clearance with the outer surface 41 of the seal 31 of approximately 0.030 to 0.040 inch, and it is now apparent that this predetermined spacing or clearance permits relative radial movement between the seal 31 and mounting member 32 corresponding to bearing lateral or eccentric rotation between the axle and its housing. The flexible O-ring 33 seals the space or diameter clearance, shown at 51, between the outer surface 41 of the seal 31 and the margin 38 of the casing 32, and also permits the radial floating action therebetween to take place. In fact, the radial freedom of this floating action permits the closure seal 31 to center itself with respect to the seal wear ring 24, as well as adjust to the degree of bearing lateral in the bearing assembly 11, as soon as rotation of the axle takes place. Accordingly, the O-ring 33 is normally relieved of constant flexing action and a uniform clearance condition is provided and maintained around the bore 40 of the clearance seal 31. However, if eccentric rotation of the axle develops, the seal 33 will flex to permit the relative radial adjustment between the seal 31 and the mounting member 32. Inasmuch as no relative rotation between the seal and mounting member occurs, the seal 33 is not subjected to rapid wear conditions in existing interference seals whereby a long seal life is provided.

The radial slot 46 permits radial movement of the seal 31 a distance at least as great as the clearance between the outer diameter 41 of the seal body 39 and the free margin 38 of the casing flange 37. The single slot 46 of the seal is on a horizontal line and free floating action or eccentric, non-rotational movement of the seal relative to the mounting member 32 can take place. The engagement of the pin or boss 47 in the horizontal slot 46 also tends to support the seal 31 in a concentric position with the axle 13.

Referring now to FIG. 5, the invention may be embodied in an interference or rubbing type seal 55 having a seal body 56 with spaced sealing lips 57 formed on the inner diameter surface thereof. The outer diameter surface 58 has an annular groove 59 for receiving the resilient seal 33, and the outer surface 58 is spaced from the inner margin 38 of the casing flange 37 a predetermined distance. The seal 55 also includes a radially extending flange 60 having a radial slot 61 in which the pin or boss 47 of the casing 32 is received. The lips 57 of the seal 55 are positioned immediately adjacent to the wear ring surface 25 to have an interference running fit therewith. Inasmuch as the non-rotating floating action of the interference seal 55 is the same as that of the clearance seal 31, it is now apparent that the extreme resilient properties of most interference seals are not required in the present construction. Accordingly, the seal 55 is preferably formed of nylon or like material having a slight degree of resiliency or yieldability, and having a hardness in the range of white metals and excellent abrasive resistance and stability at high temperatures.

It is apparent that the invention is not limited to the specific form of the interference seal 55 herein shown, and that other seals may be used. It is also apparent that the specific clearance dimensions set out only applicable to a bearing assembly and axle housing of the size of a typical railroad car journal, and the different size and types of bearings will have different degrees of bearing lateral. With regard to definitions, "close" and "immediately adjacent" as used herein in reference to the tolerances between the sealing surface and the seal is applicable as a generic term to both interference seals and clearance seals and means a sealing relationship in which the degree of resiliency of interference seals 55 or the diameter clearance 51 of clearance seals 31 is substantially less than the bearing lateral or the clearance or space between the seal outer diameter surface 41, 58 and the casing inner diameter margin 38.

This disclosure is intended to cover all changes and modifications of the present invention which will be readily apparent to all skilled in the art, and the invention is only to be limited by the claims which follow.

What I claim is:

1. An annular seal assembly for relatively rotatable parts comprising a casing having a seal carrying flange with a free margin, a seal member in slidable contact with one side of said flange and having a predetermined clearance with said margin for relative movement therebetween, a resilient seal in sealing contact with said seal member and with the other side of said casing adjacent to the clearance therebetween, said resilient seal maintaining the slidable contact between said seal member and casing, and means for preventing relative rotation between said casing and seal member.

2. An annular seal assembly comprising a casing having a radial flange with a seal contacting surface and a seal clearance margin adjacent thereto, a seal member including a radial flange in sliding surface abutment with the seal contacting surface of said casing flange and also including an axially extending seal body having a casing clearance surface adjacent to said seal member flange and in predetermined radially spaced relation with said seal clearance margin, resilient sealing means in sealing engagement with said seal body and casing flange for sealing across the radial space between the clearance surfaces thereof and permitting relative radial movement therebetween, and means for preventing relative rotation between said casing and seal member and permitting relative radial movement therebetween.

3. In combination with an axle mounted for rotation within the bore of a stationary housing and having its axis offset from the axis of said housing bore, a seal assembly comprising a casing mounted in sealed relationship in the housing bore, a first seal having a first portion with a surface in sealing relationship with said axle and a second portion in slidable surface contact with said casing for movement relative thereto, and a second seal having sealing contact with said casing and first seal and maintaining said casing and second portion of said first seal in surface contact.

4. A seal assembly for sealing across an open end of a chamber between relatively rotatable first and second parts, said seal assembly comprising a seal member having a sealing portion and a radial mounting flange formed on one end of said sealing portion, a resilient seal seated on the radially outer surface of said sealing portion in predetermined spaced relation with said mounting flange, and a seal casing adapted to be rigidly mounted on a first part and including a radial flange positioned between said mounting flange and resilient seal, said casing flange having a free margin with predetermined clearance relative to the radially outer surface of said sealing portion to provide for relative radial movement between said seal member and casing and to permit removal of said seal member and replacement thereof.

5. A seal assembly for sealing across an open end of a chamber between relatively rotatable first and second parts, said seal assembly comprising a casing adapted to be secured to a first part and including a rigid radial flange having inner and outer surfaces relative to the cavity and a free margin, a seal member formed of substantially rigid material and including a radial mounting flange slidably mounted against the outside surface of said casing flange and a sealing portion formed integral with said mounting flange and extending axially inwardly of said casing flange, said sealing portion having a radially outer surface with a predetermined radial clearance with said free margin of said casing flange to provide for relative radial movement between said casing and said seal member, said outer surface of said sealing portion having a seal seating groove a distance smaller than the width of said casing flange, a resilient seal in said seal seating groove of said sealing portion and under sealing compression against the inner surface of said casing flange retaining said seal member in slidable position on said casing flange, and means for preventing relative rotation between said casing and seal member including a radial slot formed in the flange of one of said casing and seal member and a pin secured to the flange of the other of said casing and seal member and positioned in said radial slot.

References Cited in the file of this patent

UNITED STATES PATENTS 2,742,306     Kelso et al. _____ Apr. 17, 1956